United States Patent
Maggard

(10) Patent No.: US 10,856,467 B2
(45) Date of Patent: Dec. 8, 2020

(54) AUTONOMOUS MOWER CUTTING SYSTEMS

(71) Applicant: MTD PRODUCTS INC, Valley City, OH (US)

(72) Inventor: Jay Maggard, Valley City, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 16/552,171

(22) Filed: Aug. 27, 2019

(65) Prior Publication Data

US 2019/0380267 A1 Dec. 19, 2019

Related U.S. Application Data

(63) Continuation of application No. PCT/US2018/026462, filed on Apr. 6, 2018.
(Continued)

(51) Int. Cl.
*A01D 34/58* (2006.01)
*A01D 34/00* (2006.01)
(Continued)

(52) U.S. Cl.
CPC ........... *A01D 34/58* (2013.01); *A01D 34/008* (2013.01); *A01D 34/435* (2013.01);
(Continued)

(58) Field of Classification Search
CPC .... A01D 34/58; A01D 34/008; A01D 34/435; A01D 34/535; A01D 34/57; A01D 34/62; A01D 34/42; F16H 2200/2094; F16H 3/44
See application file for complete search history.

(56) References Cited

U.S. PATENT DOCUMENTS

| 1,441,720 A | * | 1/1923 | Bahnsen | A01D 34/475 |
| | | | | 56/249 |
| 2,269,920 A | * | 1/1942 | Seaver | A01D 34/42 |
| | | | | 56/249 |

(Continued)

FOREIGN PATENT DOCUMENTS

| GB | 263597 A | 1/1927 |
| WO | 2015040987 A1 | 3/2015 |
| WO | 2017223568 A1 | 12/2017 |

OTHER PUBLICATIONS

International Search Report and Written Opinion issued in International Application No. PCT/US2018/026462 dated Jul. 4, 2018, pp. 1-11.

*Primary Examiner* — Abigail A Risic
(74) *Attorney, Agent, or Firm* — Wegman Hessler

(57) ABSTRACT

An autonomous mobile work system (20) includes a drive wheel (34) that is connected to a frame (24) and a rotating blade assembly (36). The rotating blade assembly (36) includes a blade assembly axis of rotation (38) and is connected to the frame (24) within a housing (26). The mobile work system (20) further includes a single motor (40) operably connected to the blade assembly (36). The motor (50) includes a motor output shaft (44) and the motor output shaft (44) includes an output shaft axis of rotation (46). The mobile work system (20) still further includes a gear box (50) operably connected to the drive wheel (34) and the motor output shaft (44). The single motor (50) urges rotation of both the rotating blade assembly (36) and the drive wheel (34). The gear box (50) can include a planetary gear set (104) including a ring gear (110) defining cavities (120) at its outside diameter (124). A locking shaft (126) can rotate between an engaged position and a disengaged position with one of the cavities (120).

12 Claims, 6 Drawing Sheets

Related U.S. Application Data

(60) Provisional application No. 62/482,409, filed on Apr. 6, 2017.

(51) Int. Cl.
| | | |
|---|---|---|
| *A01D 34/43* | (2006.01) | |
| *A01D 34/53* | (2006.01) | |
| *A01D 34/57* | (2006.01) | |
| *A01D 34/62* | (2006.01) | |
| *F16H 3/44* | (2006.01) | |
| *A01D 34/535* | (2006.01) | |
| *A01D 101/00* | (2006.01) | |

(52) U.S. Cl.
CPC .......... *A01D 34/535* (2013.01); *A01D 34/57* (2013.01); *A01D 34/62* (2013.01); *F16H 3/44* (2013.01); *A01D 2101/00* (2013.01); *F16H 2200/2094* (2013.01)

(56) References Cited

U.S. PATENT DOCUMENTS

| | | | | |
|---|---|---|---|---|
| 2,312,984 | A * | 3/1943 | Underhill | A01D 34/62 56/11.5 |
| 3,425,197 | A * | 2/1969 | Stanley | A01D 34/008 56/10.2 F |
| 4,919,224 | A | 4/1990 | Shyu et al. | |
| 5,974,347 | A * | 10/1999 | Nelson | A01D 34/008 180/168 |
| 8,634,960 | B2 * | 1/2014 | Sandin | B60L 3/0023 700/258 |

* cited by examiner

AUTONOMOUS MOWER CUTTING SYSTEMS

CROSS REFERENCE TO RELATED APPLICATION

This application is a continuation of, and claims the priority filing benefit of International Patent Application No. PCT/US2018/026462 filed Apr. 6, 2018, and U.S. Provisional Patent Application Ser. No. 62/482,409 filed Apr. 6, 2017. Each of the above listed applications are incorporated herein by reference.

BACKGROUND

1. Field of the Disclosure

This application relates generally to autonomous lawn maintenance vehicles, and more specifically to an autonomous lawn maintenance vehicle including a single motor configured to drive a cutting apparatus and rotate at least one drive wheel.

2. Description of Related Art

Conventional autonomous lawn maintenance vehicles are often provided with multiple dedicated motors and controllers that separately control each drive wheel and the rotating blade(s) for cutting vegetation. For example, many available autonomous lawn maintenance vehicles include two drive wheels and one rotating blade assembly that require three individual motors and controllers to provide power and control to each of those components in a one-to-one ratio. However, certain efficiencies can be gained by providing one motor to provide power to all of the described rotating components. Accordingly, improvements to lawn maintenance vehicles are desired.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, the subject application involves an autonomous mobile work system including a frame and a housing connected to the frame. The housing has an outer circumference and an open lower portion. The mobile work system also includes a drive wheel that is connected to the frame and a rotating blade assembly. The rotating blade assembly is connected to the frame within the housing and is configured to cut vegetation. The blade assembly includes a blade assembly axis of rotation. The mobile work system further includes a single motor operably connected to the blade assembly. The motor includes a motor output shaft and the motor output shaft includes an output shaft axis of rotation. The mobile work system still further includes a gear box operably connected to the drive wheel and the motor output shaft. The single motor urges rotation of both the rotating blade assembly and the drive wheel.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

DETAILED DESCRIPTION

Figure 1:
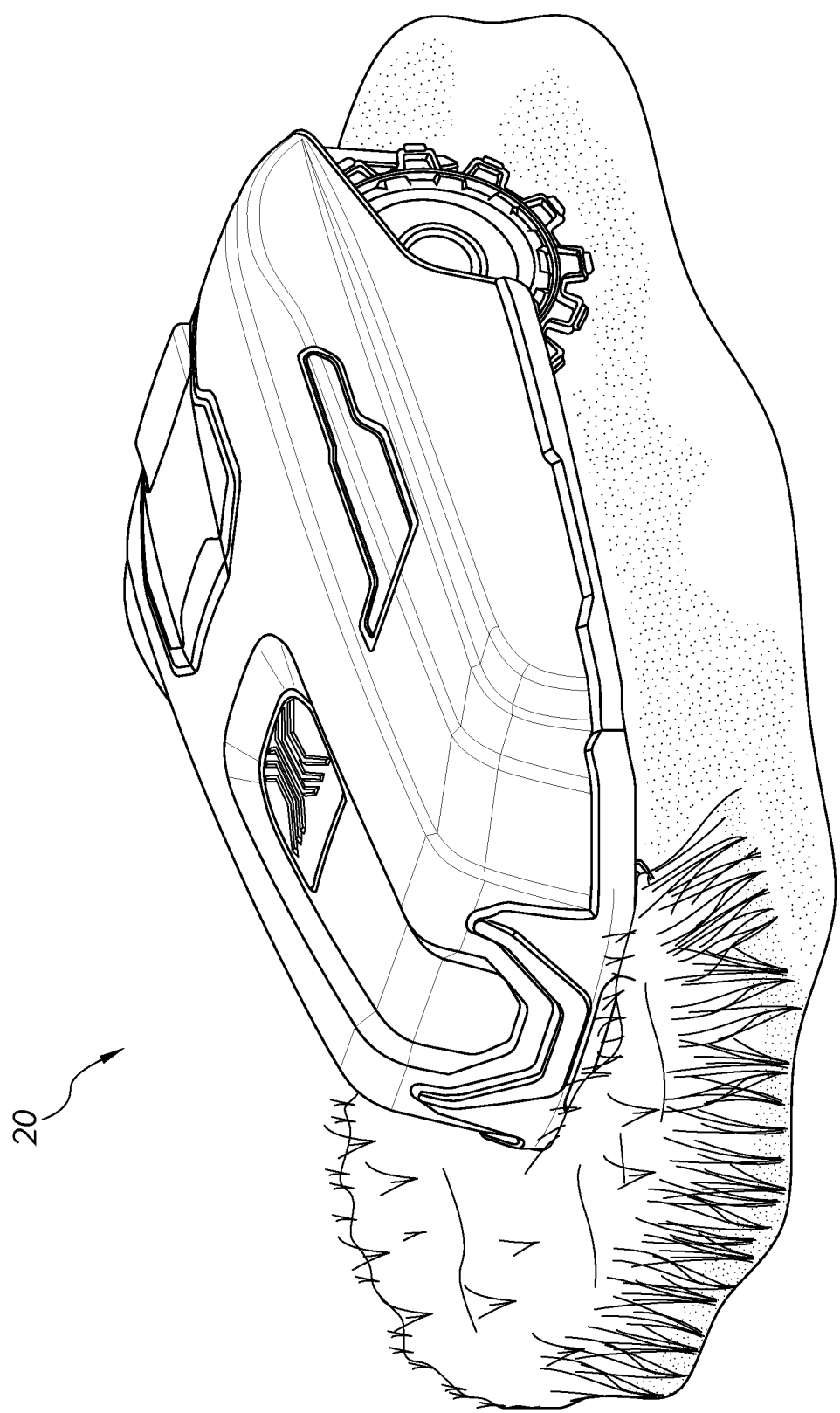
FIG. 1 is a top perspective view of an autonomous mobile work system on a driven surface with grass and or vegetation in accordance with aspects of the present disclosure.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

FIG. 1 shows a bottom perspective view of an example autonomous mobile work system 20. In one example, the autonomous mobile work system 20 is a fully autonomous residential lawn mowing device. The autonomous mobile work system 20 includes a frame 24. A housing 26 is connected to the frame 24, and the housing 26 has an outer circumference 28 and an open lower portion 30.

The autonomous mobile work system 20 also includes a drive wheel 34 that is rotatably connected to the frame 24. In the shown example, there are two drive wheels 34, placed generally on opposing sides of the autonomous mobile work system 20. It is to be understood that a portion of the drive wheels 34 can be located within the housing 26, and a relatively small portion of the drive wheels 34 may be exposed to contact a driven surface (e.g., a lawn) to propel and guide the autonomous mobile work system 20.

Between each of the drive wheels 34, is a rotating blade assembly 36 that is rotatably connected to the frame 24, and the rotating blade assembly 36 is configured to cut vegetation. Any suitable blade assembly is acceptable, however, one example of the rotating blade assembly 36 is a flail cutter, as shown in each of the figures. In one example, the rotating blade assembly 36 rotates about a blade assembly axis of rotation represented by the line 38. In a further example, the blade assembly axis of rotation 38 of the rotating blade assembly 36 can be collinear with a central axis of the drive wheels 34. Similar to the drive wheels 34, a portion of the rotating blade assembly 36 can be positioned within the housing 26, and a relatively small portion of the rotating blade assembly 36 may be exposed to contact a driven surface (e.g., a lawn) to propel and guide the autonomous mobile work system 20. In another example, the entire rotating blade assembly 36 is located within the housing 26.

Figure 3:
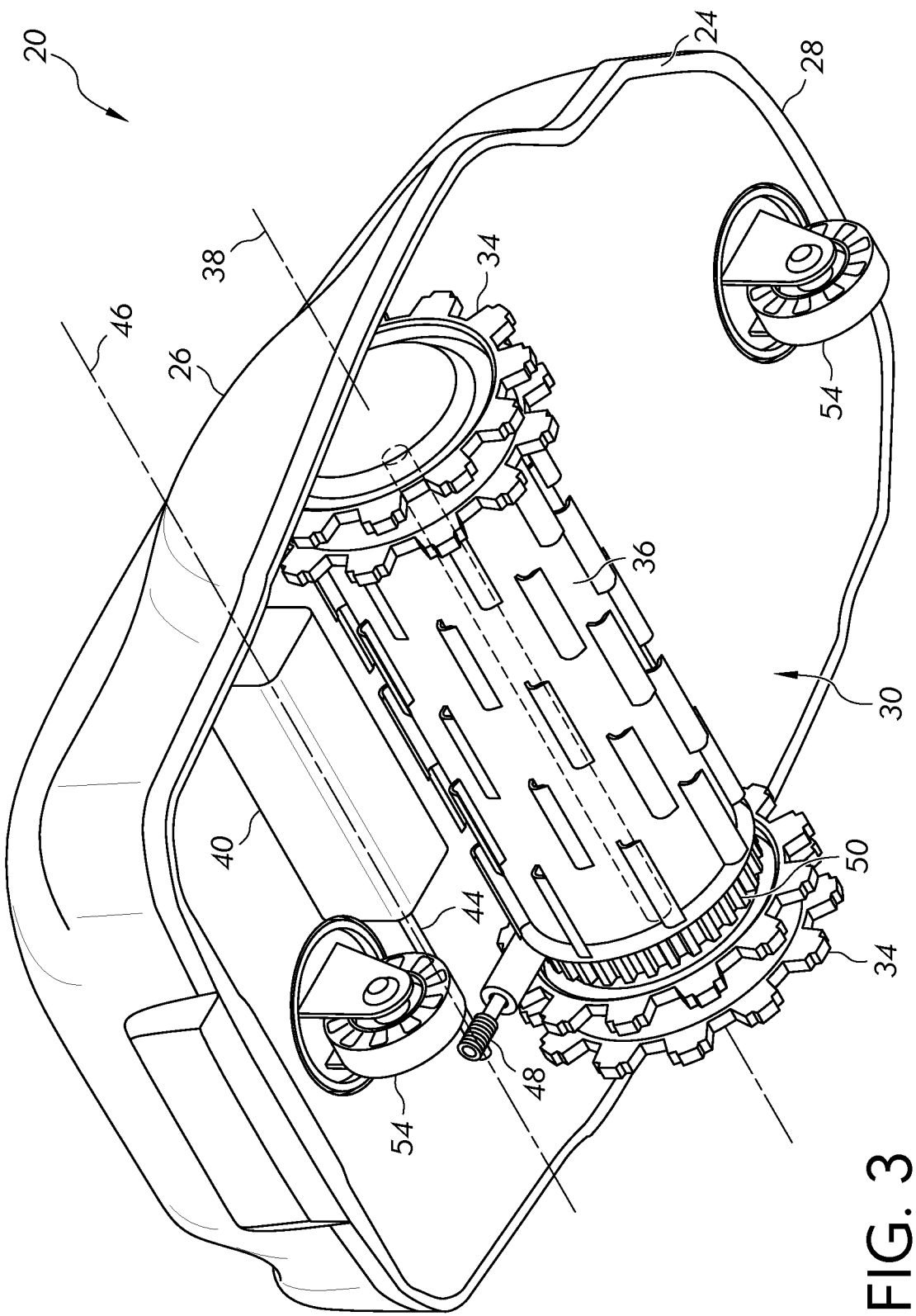
FIG. 3 is similar to FIG. 2 showing a blade assembly axis of rotation parallel to and not collinear with an output shaft axis of rotation.
Figure 4:
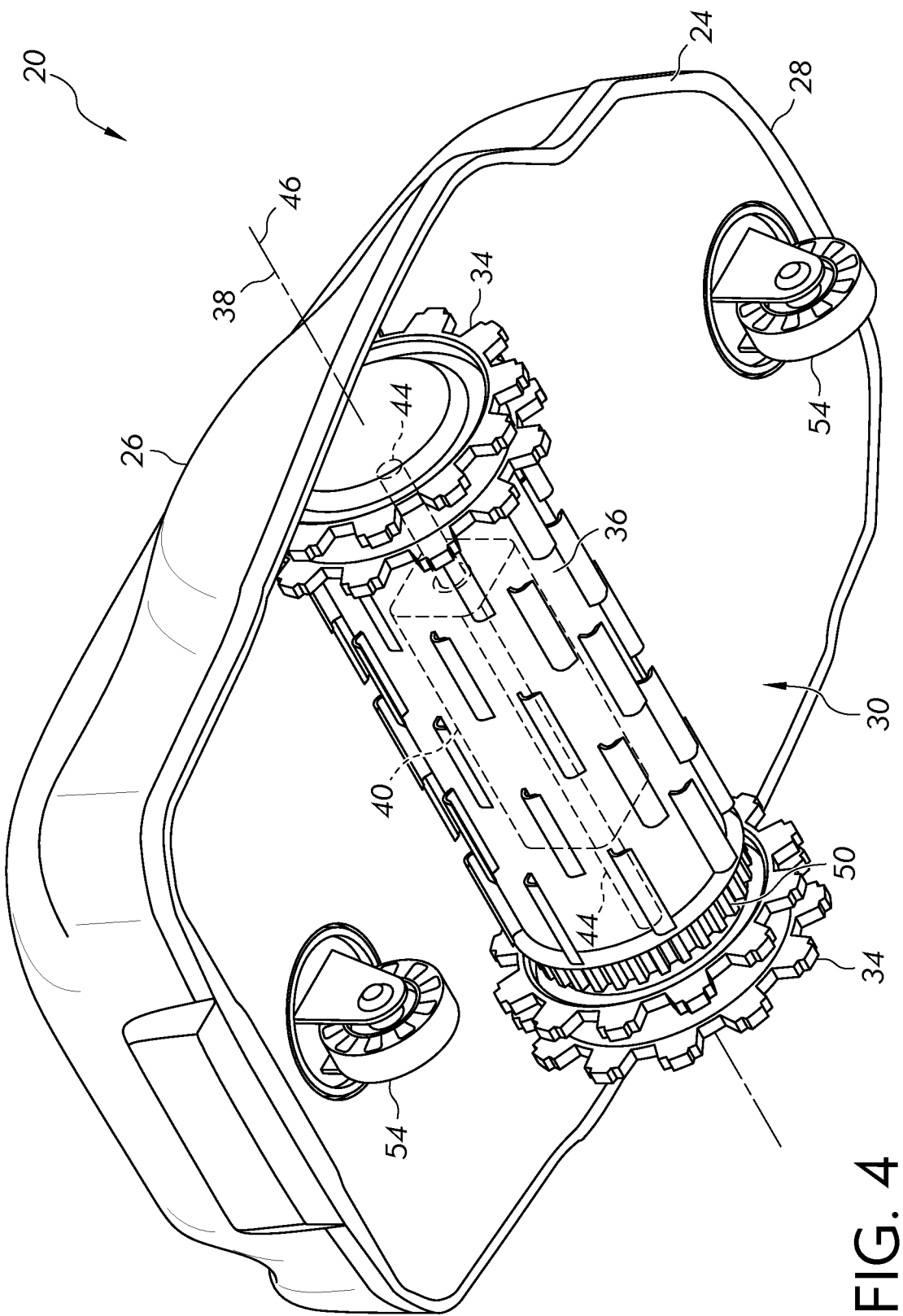
FIG. 4 is similar to FIG. 2 showing the gearbox inboard of the drive wheel.

The autonomous mobile work system 20 further includes a single motor 40. The single motor 40 includes a motor output shaft 44, and the motor output shaft includes an output shaft axis of rotation represented by line 46. The single motor 40 is operably connected to the rotating blade assembly 36 and the drive wheels 34. As such, the single motor 40 is a single power source to urge rotational motion of the blade assembly 36 and the drive wheels 34. In the examples shown in FIGS. 1 and 3, the motor output shaft 44 can be a double-ended motor shaft such that the single motor 40 is located generally within the outer perimeter of the rotating blade assembly 36. As shown in FIGS. 1 and 3, the output shaft axis of rotation 46 and the blade assembly axis of rotation 38 are collinear.

Figure 2:
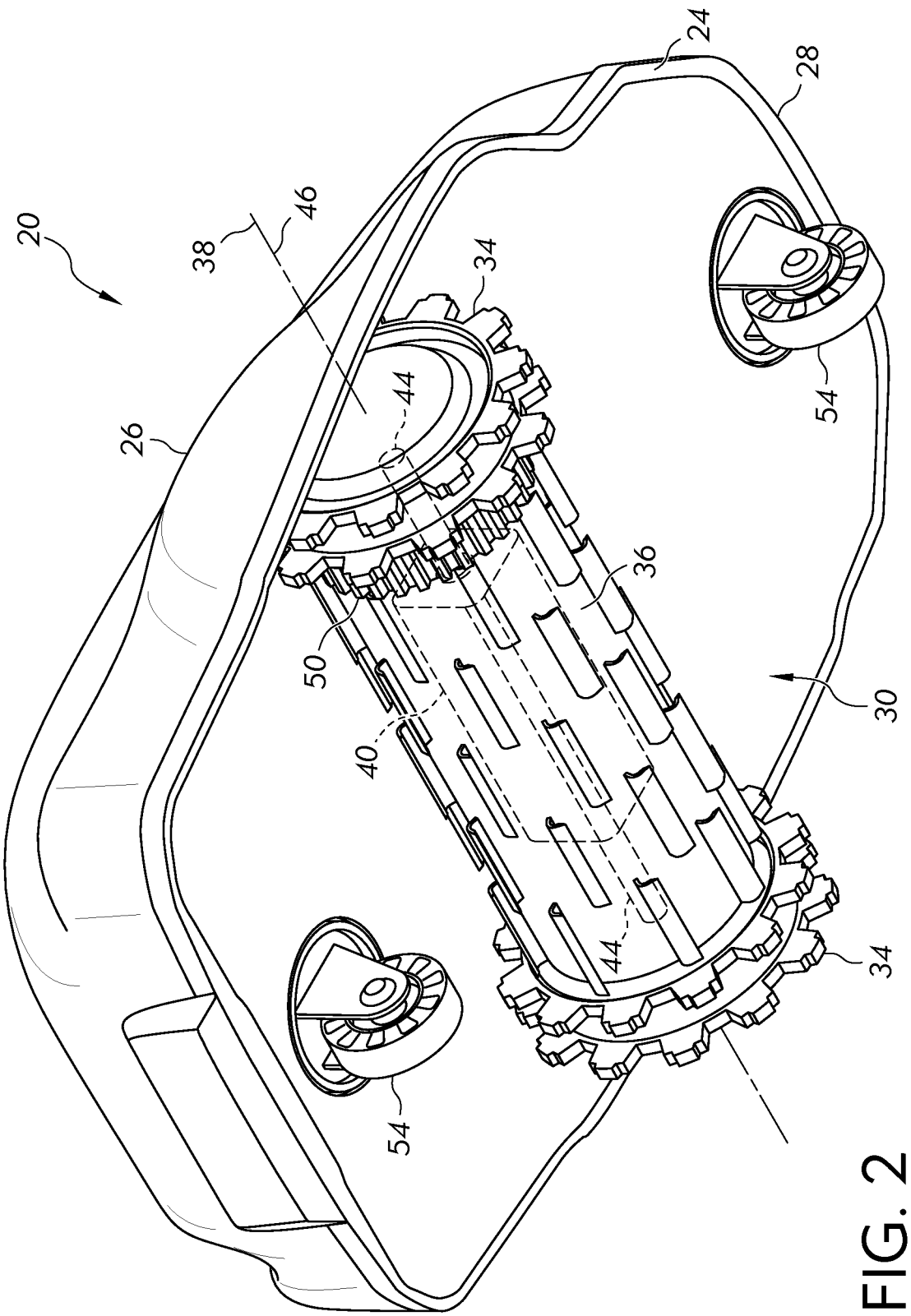
FIG. 2 is a bottom perspective view of the autonomous mobile work system of FIG. 1 showing a blade assembly axis of rotation collinear with an output shaft axis of rotation and a gear box located outboard of a drive wheel.

In the example shown in FIG. 2, the motor output shaft 44 is oriented parallel to the blade assembly axis of rotation 38 such that the output shaft axis of rotation 46 and the blade assembly axis of rotation 38 are not collinear. In this example, further power transmission components 48 such as gears, belts, chains, etc. may be required to transfer rotation power from the motor output shaft 44 to the rotating blade assembly 36 and the drive wheels 34. In each of the examples shown in FIGS. 1-3, the output shaft axis of rotation 46 and the blade assembly axis of rotation 38 are horizontal.

Regardless of the orientation of the output shaft axis of rotation 46 and the blade assembly axis of rotation 38, the single motor 40 urges rotation of both the rotating blade assembly 36 and the drive wheels 34.

Returning to FIG. 1, during operation of the autonomous mobile work system 20, it is often advantageous to operate the drive wheels 34 at differing speeds to effect turns, straight-line driving accommodating for sliding on sloped surfaces, etc. In this case, a gear box 50 is operably connected to the drive wheel 34 and the motor output shaft 44. While not visible, another gear box is located on the opposite side of the autonomous mobile work system 20. The gear box 50 accepts input from the motor output shaft 44. In one example, the motor output shaft 44 may be rotating in one rotational direction whenever it is in operation. The gear box 50 accepts the input and develops output to drive the drive wheel 34 in one of a first rotational direction (e.g., clockwise), a second rotational direction (e.g., counter-clockwise), or no rotation (e.g., neutral). A controller (not shown) can provide input to the gear box 50 such that the gear box 50 develops output in the proper rotational direction in order to steer the autonomous mobile work system 20. The gear box 50 may be considered a transmission in some examples.

Additionally, each gear box 50 can operate independently of any other gear box 50. As is well understood in the art, the gear boxes 50 in FIG. 1 can have a mono-directional rotational input and generate a non-rotational output or a rotational output of infinite points between a maximum and minimum rotational speed value in either rotational direction. The output speed and directions are then used to urge the drive wheels 34. These variable speeds and directions from the two gear boxes 50 operate the drive wheels 34 in combinations to control the autonomous mobile work system 20 speed, direction, turning direction, etc. For example, the autonomous mobile work system 20 can then remain in place, move forward, move backward, turn, turn in a zero-radius fashion, etc. because of the drive wheels 34 operating speeds and directions.

In the examples of FIGS. 1 and 2, the gear boxes 50 are shown located on the respective outboard sides of the drive wheels 34. FIG. 3 shows the gear boxes 50 located on the respective inboard sides of the drive wheels 34. It is contemplated that the gear boxes 50 could also be placed within the envelope of the drive wheels 34.

The autonomous mobile work system 20 can also include one or more caster wheels 54. The caster wheels 54 can provide additional support and balance for the autonomous mobile work system 20. The additional support can sometimes be useful in regard to the rotational forces and reactionary forces generated by the rotating blade assembly 36. For example, operation of the rotating blade assembly 36 can cause the frame 24 and the housing 26 to rotate about the axis 38 and perhaps cause one or both of the frame 24 and the housing 26 to contact the associated driven surface. The addition of one or more caster wheels 54 about the perimeter of the autonomous mobile work system 20 can help limit and/or prevent some amount of rotation of the frame 24 and the housing 26.

In a further example, the autonomous mobile work system 20 can include a blade assembly gear box operably connected to the single motor 40 and the rotating blade assembly 36. The blade assembly gear box can be used to vary a rotational speed of the rotating blade assembly 36 with a non-variable input from the motor output shaft 44. Alternatively, the blade assembly gear box can accept a rotational input from the gear box 50. As such, the rotational speed of the rotating blade assembly 36 can be varied to a desired rotational speed.

Figure 5:
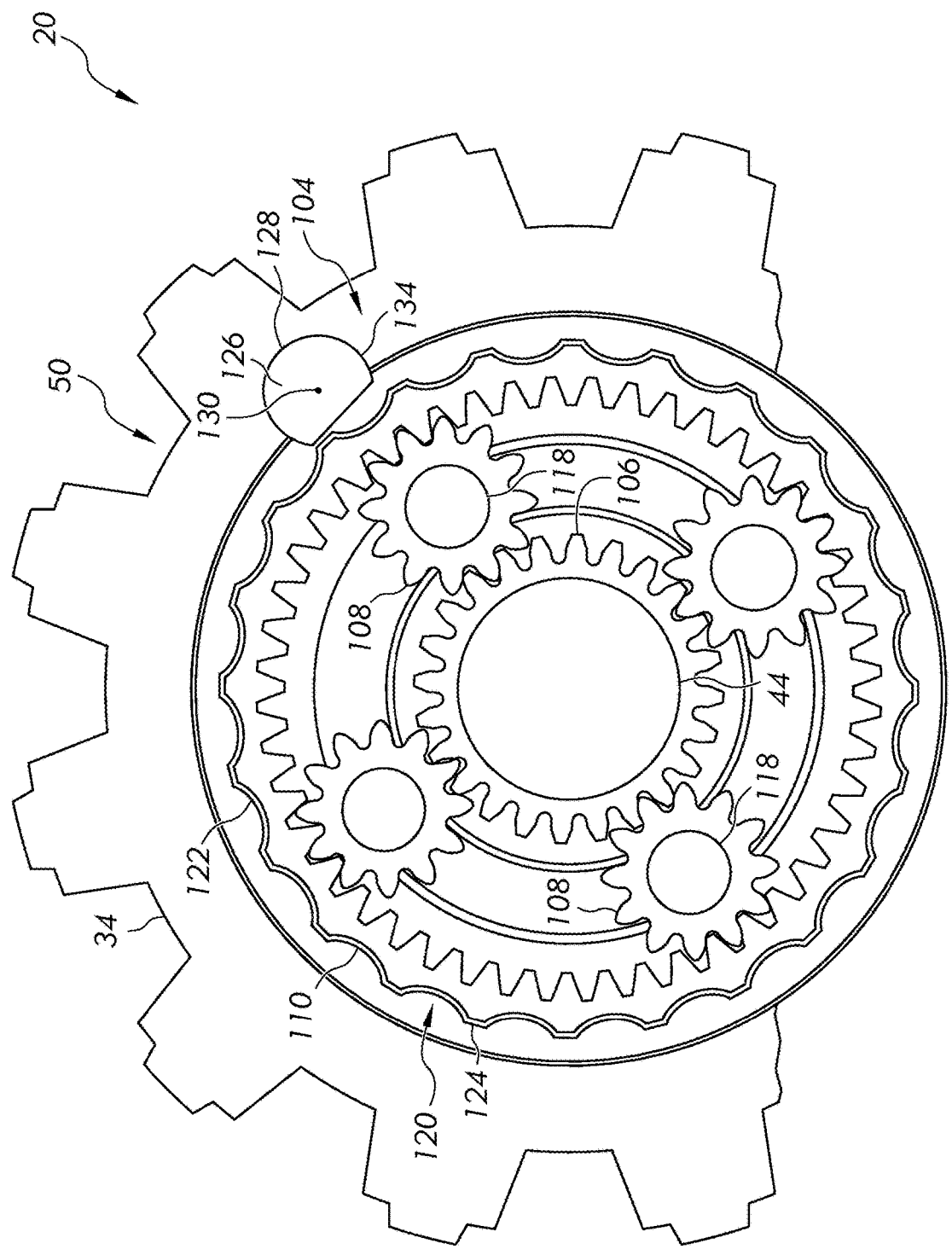
FIG. 5 is a cross-section view taken along line 5-5 of FIG. 3 showing a planetary gear set arrangement with a locking shaft in a disengaged position.

Turning to FIG. 5, a cross-section view of the gear box 50 of the autonomous mobile work system 20 is shown. In this particular example, the gear box 50 includes a planetary gear set 104. In the shown example of FIG. 5, the plurality of gears includes a sun gear 106, a plurality of planet gears 108 that are engaged with the sun gear 106, and a ring gear 110 that is engaged with the plurality of planet gears 108.

Figure 6:
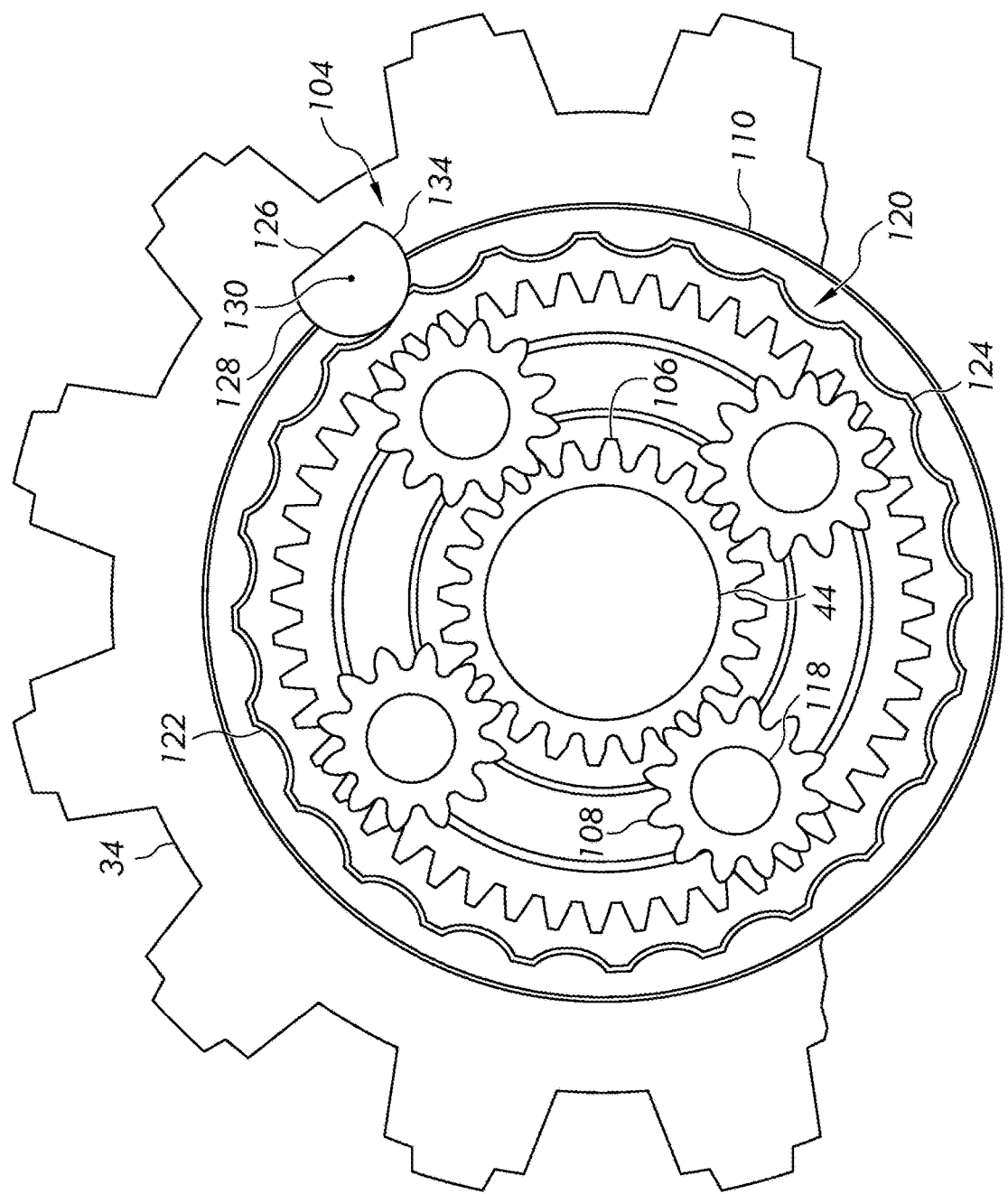
FIG. 6 is similar to FIG. 5 showing the locking shaft in an engaged position.

At least one of the gears and/or shafts defines a plurality of cavities 120. As shown in FIGS. 5 and 6, the cavities 120 are located at an outside diameter 124 of a portion of the ring gear 110. Additionally, the cavities 120 can have a curved surface 122. In the particular example shown in the figures, the ring gear 110 defines the cavities 120 at an outside diameter 124 of the ring gear 110.

The planetary gear set 104 also includes a locking shaft 126 having an outside diameter 128 and a shaft axis 130. The locking shaft 126 rotates about the shaft axis 130, and this rotation selectively moves the locking shaft 126 between an engaged position shown in FIG. 6 and a disengaged position shown in FIG. 5. The locking shaft 126 can further include a cross-section 134 that is D-shaped (best seen in FIG. 5). This non-circular (or partially circular) cross-section enables the locking shaft 126 to move between the engaged position and the disengaged position merely by rotation about its shaft axis 130. As illustrated, when the locking shaft 126 is in the disengaged position (FIG. 5), the flat portion of the D-shaped cross-section is substantially tangential to the ring gear 110 and, because of its non-circular cross-section shape, no portion of the locking shaft 126 enters the space within the cavity 120. However, as the locking shaft 126 rotates into the engaged position (FIG. 6), the round portion of the D-shaped cross-section 134 extends into the cavity 120 space to engage the ring gear 110. The locking shaft 126 can be referred to as a "Maggard Key."

The locking shaft 126 is attached to the drive wheel 34. While not shown, an actuator within the drive wheel 34 can selectively rotate the locking shaft 126 between the disengaged position of FIG. 5 and the engaged position of FIG. 6. As can be appreciated, when the locking shaft 126 is in the disengaged position, the drive wheel 34 is can rotate independently of the ring gear 110. When the locking shaft 126 is in the engaged position, the drive wheel 34 is urged to rotate with rotation of the ring gear 110. As can also be appreciated, various gearing ratios within the planetary gear set 104 can be selected to effect a particular drive wheel 34 rotational speed to develop motion of the autonomous mobile work system 20 at a desired velocity. Additionally, the locking shafts 126 of each side can be selectively engaged to urge forward travel, or turning about a desired turning radius, or even turning about a central vertical axis that can pass through the center of the autonomous mobile work system 20.

In other words, the engaged position of the locking shaft 126 creates a physical interference to urge rotational motion of the drive wheel 34. Additionally, the disengaged position of the locking shaft 126 removes the described physical interference and enables the ring gear 110 to rotate relative to the drive wheel 34.

As previously discussed, the engaged position places the outside diameter 128 of the locking shaft 126 into engagement with the ring gear 110. In this example, the locking shaft 126 rotates into and out of the engaged position through sliding contact with the curved surface 122 of the ring gear 110. The described arrangement of the locking shaft 126 and its partially circular cross-section 134 cooperating with the curved surface 122 of the cavity 120 can provide the benefit of significantly reducing the force required to engage or disengage the locking mechanism. This is particularly true while the motor output shaft 44 is under load. For example, previously known devices can include "in-out" or "up-down" designs which require either significant force to disengage the locking mechanism or even an elimination of the rotational load on the gear train in order to disengage the locking mechanism. The same degree of difficulty in operation can be true of known rotating pawl designs that interact with cooperating shapes on gears and/or shafts. However, the described locking shaft 126 can be rotated into and out of the engaged position with the ring gear 110 under load and even when the ring gear 110 is rotating. As such, the gear train locking device 100 does not require a clutch.

In one example, each drive wheel 34 will not rotate when the locking shaft 126 is in the disengaged position due to the resistance provided by bearings, seals, and the ground contact of the drive wheels 34. As a result, even though the motor output shaft 44 can be in continuous rotation, the drive wheels 34 do not turn when the locking shaft 126 is in the disengaged position. In another example, a wheel or axle brake may be employed with this apparatus, but it is not necessary.

As a controller (not shown) determines to engage the drive wheels 34 of the autonomous mobile work system 20, the controller can urge rotation of the locking shaft 126 through an actuator (not shown). The locking shaft 126 then rotates from the disengaged position shown in FIG. 5 to the engaged position shown in FIG. 6. This rotation can be effected even as the ring gear 110 is rotating. As the circular portion of the cross-section 134 enters the cavity 120, the physical interference between the locking shaft 126 of the drive wheel 34 and the ring gear 110 eliminates relative motion between the drive wheel 34 and the ring gear 110 to rotate the drive wheel 34. As such, no clutch is needed to stop the ring gear 110 even when shifting between drive and neutral operations.

When the controller (not shown) determines to disengage the drive again, the locking shaft 126 is urged to the disengaged position. Even as the ring gear 110 is under a rotational load condition or even while rotating, rotation of the locking shaft 126 is relatively easy, as the D-shaped cross-section 134 rotates in sliding engagement with the curved surface 122, enabling disengagement of the locking shaft 126 with relatively little force required. Additionally, the described apparatus and methods enable the use of a gear train locking device to engage elements of the gear train, transmission, epicyclic drive, etc. without using a clutch while the elements to be engaged are under load and/or are rotating.

The motor output shaft 44 is an elongated shaft that is rotatable relative to the transfer casing 40. At least a portion of the motor output shaft 44 extends forwardly from the planetary gear set 104 to be operatively connected to the motor 40. The motor output shaft 44 is configured to rotate about is longitudinal axis, which is horizontally oriented. The motor output shaft 44 can be positively positioned by way of bearings (not shown).

One having skill in the art will understand that differing planet gear 216 arrangements can produce various gear reductions to produce desired forward and reverse speeds for the autonomous mobile work system 20. For example, using the planetary gear sets 104, differing positions of the gears, locking devices, etc. can develop a reverse gear having speeds in particular ratios to the speeds of the forward gear.

It is also to be appreciated that the present disclosed apparatus can be used to shift between forward and reverse gears in a transmission. Because of the rotational motion of the locking shaft 126 and the sliding contact with the cavities 110, this shift can be achieved with relatively low force. Furthermore, the transmission can be shifted between forward and reverse gears without a clutch and while the transmission is under load.

The planetary gear set 104 also enables rotational power from the motor drive shaft 44 to be transferred to the rotating blade assembly 36. In one example, a planet gear carrier (not shown) can be attached to the planet gear shafts 118. The planet gear carrier can then be attached to the rotating blade assembly 36 such that rotational power from the motor drive shaft 44 is transferred to the rotating blade assembly 36. In this arrangement, the rotating blade assembly 36 will rotate commensurate with the rotation rate of the planet gears 108. Alternatively, a transfer gear or other structure can be attached to the sun gear 106, which is then attached to the rotating blade assembly 36. In this arrangement, the rotating blade assembly 36 will rotate commensurate with the rotation rate of the sun gear 106. Regardless of the attachment method, the planetary gear set 104 thus provides rotational power to the rotating blade assembly 36 and the drive wheels 34 using a single power source or driver, e.g., motor 40.

It is to be understood that the disclosed apparatus for an autonomous mobile work system can provide several advantages. In one example, the described autonomous mobile work system can eliminate the need for at least one, and sometimes a number of brushless motors and controllers. In turn, this can reduce the assembly time, increase the overall device simplicity, and reduce the weight of the autonomous mobile work system. These improvements can also lead to cost savings and reductions in the amount of manufacturing time necessary to build the autonomous mobile work system.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Combinations of the above embodiments and other embodiments will be apparent to those of skill in the art upon studying the above description and are intended to be embraced therein. Therefore, the scope of the present invention is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous mobile work system (20) characterized by:
    a frame (24);
    a housing (26) connected to said frame (24), wherein said housing (26) has an outer circumference (28) and an open lower portion (30);
    a drive wheel (34), wherein said drive wheel (34) is connected to said frame (24);
    a rotating blade assembly (36), wherein said rotating blade assembly (36) is connected to said frame (24) within said housing (26) and is configured to cut vegetation, wherein said blade assembly (36) includes a blade assembly axis of rotation (38);
    a single motor (40) operably connected to said blade assembly (36), wherein said motor (40) includes a motor output shaft (44), and said motor output shaft (44) includes an output shaft axis of rotation (46); and
    a gear box (50) operably connected to said drive wheel (34) and said motor output shaft (44), said gear box (50) comprising a planetary gear set (104), said planetary gear set comprising a ring gear (110) having an outside diameter (124), wherein said ring gear (110) defines a plurality of cavities (120) at said outside diameter (124), and a locking shaft (126) configured to enter a space within one of said plurality of cavities (120) by rotating between an engaged position and a disengaged position; and
    wherein said single motor (40) urges rotation of both said rotating blade assembly (36) and said drive wheel (34).

2. The autonomous mobile work system (20) of claim 1, wherein said output shaft axis of rotation (46) and said blade assembly axis of rotation (38) are horizontal.

3. The autonomous mobile work system (20) of claim 1, wherein said output shaft axis of rotation (46) and said blade assembly axis of rotation (38) are parallel.

4. The autonomous mobile work system (20) of claim 1, wherein said output shaft axis of rotation (46) and said blade assembly axis of rotation (38) are collinear.

5. The autonomous mobile work system (20) of, claim 1, wherein said rotating blade assembly (36) comprises a flail-type vegetation cutter.

6. The autonomous mobile work system (20) of claim 1, wherein said gear box (50) accepts input from said motor output shaft (44) rotating in one rotational direction and develops rotational output in one of a first rotational direction, a second rotational direction, or no rotation.

7. The autonomous mobile work system (20) of, claim 1, wherein each gear box (50) can operate independently of any other gear box.

8. The autonomous mobile work system (20) of, claim 1, wherein said single motor (40) comprises a double-ended motor shaft.

9. The autonomous mobile work system (20) of claim 1, comprising a caster wheel (54).

10. The autonomous mobile work system (20) of claim 1, comprising a blade assembly gear box operably connected to said single motor (40) and said rotating blade assembly (36).

11. The autonomous mobile work system (20) of claim 1, wherein said autonomous mobile work system (20) is a fully autonomous residential lawn mowing device.

12. The autonomous work system (20) of claim 1, wherein said locking shaft (126) rotates into and out of said engaged position through sliding contact with said curved surface (122) of said ring gear (110).

* * * * *